(12) United States Patent  (10) Patent No.: US 7,747,042 B2
Blaine  (45) Date of Patent: Jun. 29, 2010

(54) DEFINING AND CHECKING CONFORMANCE OF AN OBJECT SHAPE TO SHAPE REQUIREMENTS

(75) Inventor: George Blaine, Lake Stevens, WA (US)

(73) Assignee: John Bean Technologies Corporation, Chicago, IL (US)

( * ) Notice: Subject to any disclaimer, the term of this patent is extended or adjusted under 35 U.S.C. 154(b) by 1217 days.

(21) Appl. No.: 11/324,027

(22) Filed: Dec. 29, 2005

(65) Prior Publication Data

US 2006/0171581 A1  Aug. 3, 2006

Related U.S. Application Data

(60) Provisional application No. 60/640,282, filed on Dec. 30, 2004.

(51) Int. Cl.
G06K 9/00 (2006.01)
(52) U.S. Cl. .................... 382/110; 348/92; 345/441
(58) Field of Classification Search ............... 382/100, 382/108, 110, 141, 151, 165, 170, 181, 190, 382/195, 199, 203; 348/92; 345/441
See application file for complete search history.

(56) References Cited

U.S. PATENT DOCUMENTS

| | | | |
|---|---|---|---|
| 3,639,903 A | | 2/1972 | Nashljunas et al. |
| 4,783,829 A | | 11/1988 | Miyakawa |
| 4,962,568 A | | 10/1990 | Rudy et al. |
| RE33,851 E | | 3/1992 | Rudy |
| RE33,904 E | | 4/1992 | Rudy |
| 5,136,906 A | * | 8/1992 | Antonissen et al. ............ 83/42 |
| 5,267,168 A | | 11/1993 | Antonissen |
| 5,351,310 A | | 9/1994 | Califano |
| 5,585,603 A | | 12/1996 | Vogeley, Jr. |
| 5,668,634 A | | 9/1997 | Newman |
| 5,793,879 A | * | 8/1998 | Benn et al. .................. 382/110 |
| 5,867,592 A | | 2/1999 | Sasada |
| 5,868,056 A | | 2/1999 | Pfarr et al. |
| 5,926,568 A | * | 7/1999 | Chaney et al. ............... 382/217 |

(Continued)

FOREIGN PATENT DOCUMENTS

EP  0 543 485 B1  12/1997

(Continued)

*Primary Examiner*—Anand Bhatnagar
(74) *Attorney, Agent, or Firm*—Christensen O'Connor Johnson Kindness PLLC

(57) ABSTRACT

A system and method are provided for automatically defining acceptable shape requirements for an object. A reference shape is a shape that the object should be in, and the acceptable shape requirements define an acceptable shape of the object that may deviate from the reference shape and yet is acceptable to a user. The system includes two elements: a processor, and a scanner coupled to the processor for scanning objects and sending scanned information of the objects to the processor. The processor is configured to perform three steps: (i) receiving scanned information of two or more acceptable shapes from the scanner; (ii) combining the scanned information of the two or more acceptable shapes to define acceptable shape requirements; and (iii) storing the acceptable shape requirements. The processor may be further configured to perform the steps of: (iv) receiving a scanned shape of an object from the scanner, and (v) determining whether the scanned shape of the object is in conformance to the acceptable shape requirements.

14 Claims, 9 Drawing Sheets

U.S. PATENT DOCUMENTS

| | | | |
|---|---|---|---|
| 5,937,080 A * | 8/1999 | Vogeley et al. | 382/110 |
| 5,944,598 A * | 8/1999 | Tong et al. | 452/158 |
| 5,960,104 A * | 9/1999 | Conners et al. | 382/141 |
| 6,031,935 A | 2/2000 | Kimmel | |
| 6,111,983 A | 8/2000 | Fenster | |
| 6,129,625 A | 10/2000 | Cate | |
| 6,230,073 B1 | 5/2001 | Kofman | |
| 6,310,964 B1 | 10/2001 | Mohan | |
| 6,335,985 B1 * | 1/2002 | Sambonsugi et al. | 382/190 |
| 6,499,842 B1 | 12/2002 | Kofman | |
| 7,106,897 B1 | 9/2006 | McIntyre | |
| 7,133,537 B1 | 11/2006 | Reid | |
| 7,153,203 B2 | 12/2006 | Pfarr | |
| 7,162,073 B1 | 1/2007 | Akgul | |
| 7,164,796 B1 | 1/2007 | Silver | |
| 7,221,786 B2 | 5/2007 | Luo | |
| 2001/0002462 A1 | 5/2001 | Kosuge | |
| 2003/0152273 A1 | 8/2003 | McCormack | |
| 2004/0037467 A1 | 2/2004 | Wenzel | |
| 2005/0036690 A1 | 2/2005 | Zhou | |
| 2005/0169533 A1 | 8/2005 | Paragyios | |
| 2006/0110046 A1 | 5/2006 | Luo | |
| 2006/0157388 A1 | 7/2006 | Blaine | |
| 2006/0171592 A1 | 8/2006 | Amico | |
| 2006/0262977 A1 | 11/2006 | Mitsui | |
| 2007/0058850 A1 | 3/2007 | Luo | |
| 2007/0071328 A1 | 3/2007 | Larsen | |

FOREIGN PATENT DOCUMENTS

| | | |
|---|---|---|
| GB | 2 409 801 A | 7/2005 |
| JP | 60140106 A | 7/1985 |

* cited by examiner

US 7,747,042 B2

DEFINING AND CHECKING CONFORMANCE OF AN OBJECT SHAPE TO SHAPE REQUIREMENTS

CROSS-REFERENCE TO RELATED APPLICATION

This application is based on and claims the benefit of U.S. Provisional Application No. 60/640,282, filed Dec. 30, 2004.

TECHNICAL FIELD

The present application relates generally to processing workpieces, such as food products, and more specifically to defining and checking whether portion (object) shapes are in conformance to acceptable shape requirements.

BACKGROUND

Workpieces, including food products, are portioned or otherwise cut into smaller pieces by processors in accordance with customer needs. Also, excess fat, bone, and other foreign or undesired materials are routinely trimmed from food products. It is usually highly desirable to portion and/or trim the workpieces into uniform sizes, for example, for steaks to be served at restaurants or chicken fillets used in frozen dinners or in chicken burgers. Much of the portioning/trimming of workpieces, in particular food products, is now carried out with the use of high-speed portioning machines. These machines use various scanning techniques to ascertain the size and shape of the food product as it is being advanced on a moving conveyor. This information is analyzed with the aid of a computer to determine how to most efficiently portion the food product into optimum sizes.

Portioning machines of the foregoing type are known in the art. Such portioning machines, or portions thereof, are disclosed in prior patents, for example, U.S. Pat. Nos. 4,962,568 and 5,868,056, which are incorporated by reference herein. Typically, the workpieces are first carried by an infeed conveyor past a scanning station, whereat the workpieces are scanned to ascertain selected physical parameters, for example, their size and shape, and then to determine their weight, typically by utilizing an assumed density for the workpieces. In addition, it is possible to locate discontinuities (including voids), foreign material, and undesirable material in the workpiece, for example, bones or fat in a meat portion.

The scanning can be carried out utilizing a variety of techniques, including a video camera to view a workpiece illuminated by one or more light sources. Light from the light source is extended across the moving conveyor belt to define a sharp shadow or light stripe line. When no workpiece is being carried by the infeed conveyor, the shadow line/light stripe forms a straight line across the conveyor belt. However, when a workpiece passes across the shadow line/light stripe, the upper, irregular surface of the workpiece produces an irregular shadow line/light stripe as viewed by a video camera directed downwardly at an angle on the workpiece and the shadow line/light stripe. The video camera detects the displacement of the shadow line/light stripe from the position it would occupy if no workpiece were present on the conveyor belt. This displacement represents the thickness (or height) of the workpiece. The width of the workpiece is determined by the width of the irregular shadow line/light stripe. The length of the workpiece is determined by the length of belt travel that shadow lines/light stripes are created by the workpiece. In this regard, an encoder is integrated into the infeed conveyor, with the encoder generating pulses at fixed distance intervals corresponding to the forward movement of the conveyor.

The data and information measured/gathered by the scanning devices are transmitted to a computer, typically on board the portioning apparatus, which records the location of the workpiece on the conveyor as well as the shape and other parameters of the workpiece. With this information, the computer determines how to optimally cut or portion the workpiece at the portioning station, and the portioning may be carried out by various types of cutting/portioning devices.

Automatic portioning systems of food products, such as boneless chicken breasts, should be capable of cutting the products into uniform shape and other specifications as provided by their users. Oftentimes, the user has a reference shape that represents the user's desired shape, and a portioning system is used to portion products into the reference shape.

As the original products, such as food products, may have randomly varying geometries, it may be preferable not to apply the reference shape rigidly to every product. For example, if there are multiple products of roughly the same size but in various shapes, it may be preferable to slightly modify the reference shape with respect to each of the multiple products so as to make the maximum use of each of the products while minimizing waste. Likewise, when checking the shape of a portion that has been cut from the original product against the reference shape, it may be preferable not to apply the reference shape rigidly, since that may cause an excessive number of portions to be rejected as non-conforming to the reference shape. Therefore, a reference shape may be provided, not as a rigid shape to be found in each and every product, but as a "reference" shape from which an actual shape of a portioned piece may slightly deviate within certain geometric guidelines and boundaries. Currently, these geometric guidelines and boundaries to be used by portioning and other workpiece processing (e.g., checking) systems are arbitrarily set by the users. The users may know whether a certain shape is acceptable or not (i.e., within acceptable tolerances of the reference shape) when they see it, but may not be able to articulate the precise definition of an acceptable shape in terms of the geometric guidelines and boundaries. Therefore, it is often difficult for the users to accurately and consistently set geometric guidelines and boundaries to be used by various workpiece processing systems that define and encompass all acceptable shapes, i.e., acceptable deviations from a reference shape.

A need exists for a system and method for accurately defining an acceptable shape, or acceptable deviations from a reference shape, so as to accommodate geometric variations found in natural products, for the purpose of portioning products and/or determining whether portions that have been cut from the products have acceptable shapes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present invention, a system for automatically defining acceptable shape requirements for an object (e.g., a portioned piece) is provided. A reference shape is a shape that the object should be in, and the acceptable shape requirements define an acceptable shape of the object that may deviate from the reference shape and yet is acceptable to a user. The system includes two elements: a processor, and a scanner coupled to the processor for scanning objects and sending the scanned information of the objects to the processor. The processor is configured to perform three steps: (i) receiving scanned information of two or more acceptable shapes from the scanner; (ii) combining the scanned information of two or more acceptable shapes to determine acceptable shape requirements; and (iii) storing the acceptable shape requirements.

In accordance with one aspect of the present invention, the step (ii) of combining the scanned information of two or more acceptable shapes consists of first aligning the two or more acceptable shapes. The aligning process may further consist of: superimposing the two or more acceptable shapes; and zooming one or more of the two or more acceptable shapes that have been superimposed so that all of the two or more acceptable shapes become substantially coincident with each other. In one embodiment, the shapes may be superimposed with each other based on (e.g., by matching) their respective centroids and principle axes.

In accordance with a further aspect of the present invention, the step (ii) of combining the scanned information of two or more acceptable shapes to define acceptable shape requirements consists of calculating or identifying any one of: (1) the inner-most and outer-most boundaries of all of the acceptable shapes; (2) the mean and standard deviation values of multiple perimeter points of all of the acceptable shapes; (3) a maximum allowable Root-Mean-Square (RMS) position error value between an acceptable shape and the reference shape; and (4) acceptable defects and attributes found in one or more of the acceptable shapes. In accordance with a still further aspect of the present invention, the acceptable shape requirements may be defined in terms of geometric guidelines (1)-(4) described above, as applied to a perimeter shape of a virtual slice taken at a certain height of an object.

In accordance with yet another aspect of the present invention, the system may further include a cutter for portioning a workpiece to produce an object (e.g., a portion), and the processor is further configured to verify whether a shape represented by a proposed cut path to be used to portion a workpiece is in conformance to the acceptable shape requirements.

In accordance with still another aspect of the present invention, the processor may be configured to verify whether an object, such as a piece or portion that has been cut from a workpiece, is in conformance to the acceptable shape requirements. To this end, the processor may be configured to perform the steps of: receiving a scanned shape of an object (e.g., a cut portion) from the scanner, and determining whether the scanned shape of the object is in conformance to the acceptable shape requirements. As before, the scanned shape of the object is first aligned (i.e., properly oriented and zoomed) with respect to the reference shape prior to the determination as to whether the scanned shape is in conformance to the acceptable shape requirements. In a further embodiment of the present invention, the processor is optionally configured to perform the steps of: taking a mirror image of the scanned shape, aligning the mirror image with the reference shape, and determining whether the mirror image is in conformance to the acceptable shape requirements. Thereafter, the scanned shape may be deemed to be in conformance to the acceptable shape requirements if either or both of the scanned shape and its mirror image is acceptable.

In accordance with one aspect of the invention, a system is provided for automatically defining acceptable shape requirements based on scanned information of a reference shape alone. For example, a maximum RMS error value allowable between the reference shape and an acceptable shape may be selected and used to define the acceptable shape requirements.

In accordance with another embodiment of the present invention, a system is provided for automatically checking whether an object (e.g., a portioned piece) is in conformance to acceptable shape requirements. The system includes a processor, a memory coupled to the processor, and a scanner also coupled to the processor. The memory stores a reference shape and acceptable shape requirements, which define geometric guidelines and boundaries for shapes that have been determined to be acceptable by a user. The processor is configured to perform the three steps of: (i) receiving a scanned shape of an object from the scanner; (ii) aligning the scanned shape of the object with the reference shape; and (iii) determining whether the scanned shape of the object is in conformance to the acceptable shape requirements.

In accordance with yet another embodiment of the present invention, a method is provided for determining whether an object shape is in conformance to acceptable shape requirements. The method includes six steps of: (a) defining a reference shape and acceptable shape requirements that specify geometric guidelines and boundaries for acceptable shapes; (b) receiving a shape to be compared against the acceptable shape requirements; (c) orienting the received shape relative to the reference shape; (d) zooming the received shape relative to the reference shape; (e) calculating a difference between the received shape and the reference shape; and (f) determining that the received shape is acceptable and in conformance to the acceptable shape requirements if the calculated difference is within a predefined threshold value.

In accordance with still another embodiment of the present invention, a computer-readable medium/signal is provided, which bears computer-executable instructions that define acceptable shape requirements. The acceptable shape requirements are automatically derived from a reference shape, and perhaps also from a combination of two or more acceptable shapes. The computer-readable medium/signal may be used to transfer the acceptable shape requirements from one computing device to another so that multiple computing devices can share the same acceptable shape requirements.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention is directed generally to a system and method for processing workpieces in conformance to shape requirements within certain tolerances with respect to a reference shape.

Figure 1A:
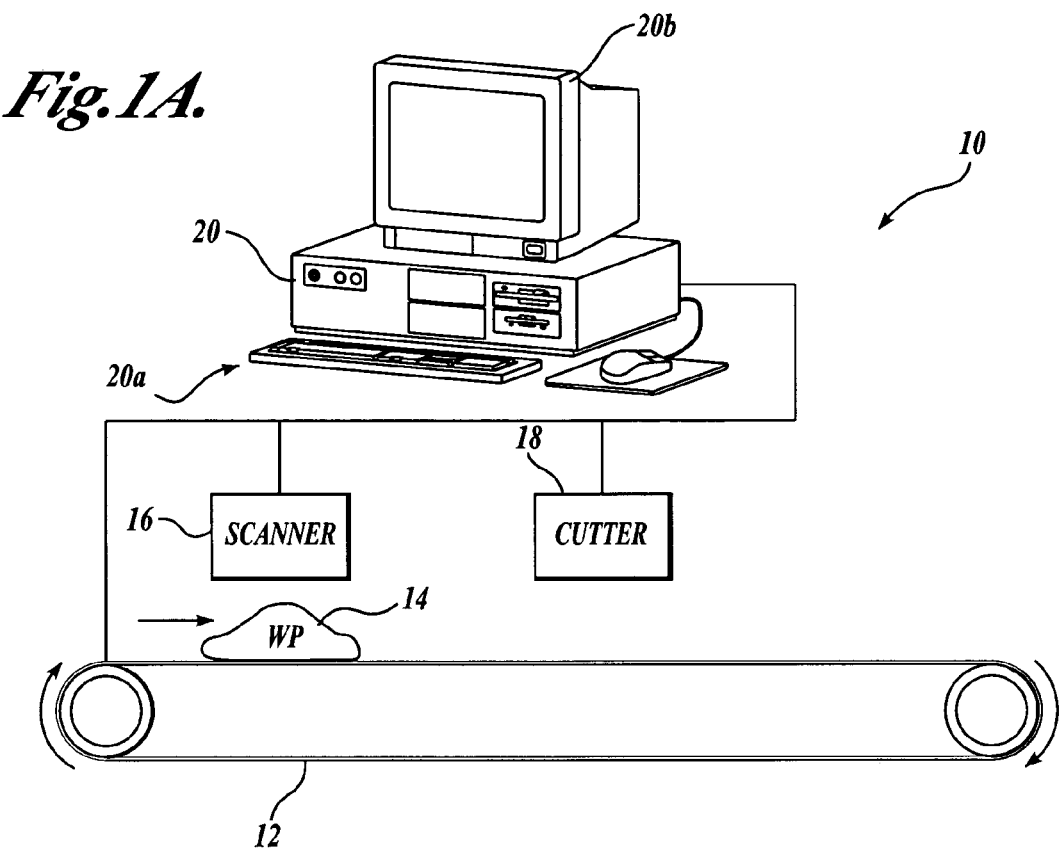
FIG. 1A illustrates a system suitable for use in performing a method of the present invention, wherein the system is operated to process (and portion) workpieces (WP) into portions in conformance to acceptable shape requirements.

FIG. 1A schematically illustrates a system 10 suitable for implementing one embodiment of the present invention. The system 10 includes a conveyor 12 for carrying a workpiece (WP) 14 to be portioned thereon, a scanner 16 for scanning the workpiece 14, and a cutter 18 for portioning the workpiece 14 into one or more pieces. The conveyor 12, scanner 16, and cutter 18 are coupled to, and controlled by, a processor 20. Generally, the scanner 16 scans in the workpiece 14 to produce scanned information representative of the workpiece, and forwards the scanned information to the processor 20. The scanner 16 may be of a variety of different types, including a video camera to view the workpiece 14 illuminated by one or more light sources (not shown). In lieu of a video camera, the scanner 16 may instead utilize an x-ray apparatus for determining the physical characteristics of the workpiece 14, including its shape, mass, and weight, as described in U.S. Pat. No. 5,585,603, which is herein incorporated by reference.

The processor 20 analyzes the scanned information to develop a thickness profile of the scanned workpiece 14. The processor 20 also develops an area and/or volume distribution of the scanned workpiece 14. The processor 20 then models the workpiece 14 to determine an optimal cut path to portion the workpiece 14 into one or more desirable pieces of specific physical criteria, including, for example, shape, weight, thickness, and size (e.g., length×width). Then, the processor 20 controls the cutter 18 to portion the workpiece 14 according to the calculated cut path. As illustrated, the processor 20 optionally includes an input device 20a (keyboard, mouse, etc.) and an output device 20b (monitor, printer, etc.).

In various exemplary embodiments, the portioning system 10 is capable of operating in generally two modes: Normal Production Mode and Reference/Acceptable Shape Definition Mode. Briefly, during Reference/Acceptable Shape Definition Mode, a user is prompted to input (e.g., scan) a reference shape and also a number of shapes that the user deems as acceptable, based, for example, on the user's visual inspection. As used herein, the term "reference shape" means an ideal shape of an object, such as a user-desired shape to which portions should be cut. The term "acceptable shape" means a shape that may slightly deviate from the reference shape but still meets the user's approval. Thus, a reference shape is one of several acceptable shapes. Once a reference shape and acceptable shapes are defined and quantified in terms of the acceptable shape requirements, then during Normal Production Mode, the portioning system automatically portions workpieces into pieces in conformance to the defined acceptable shape requirements.

Figure 1B:
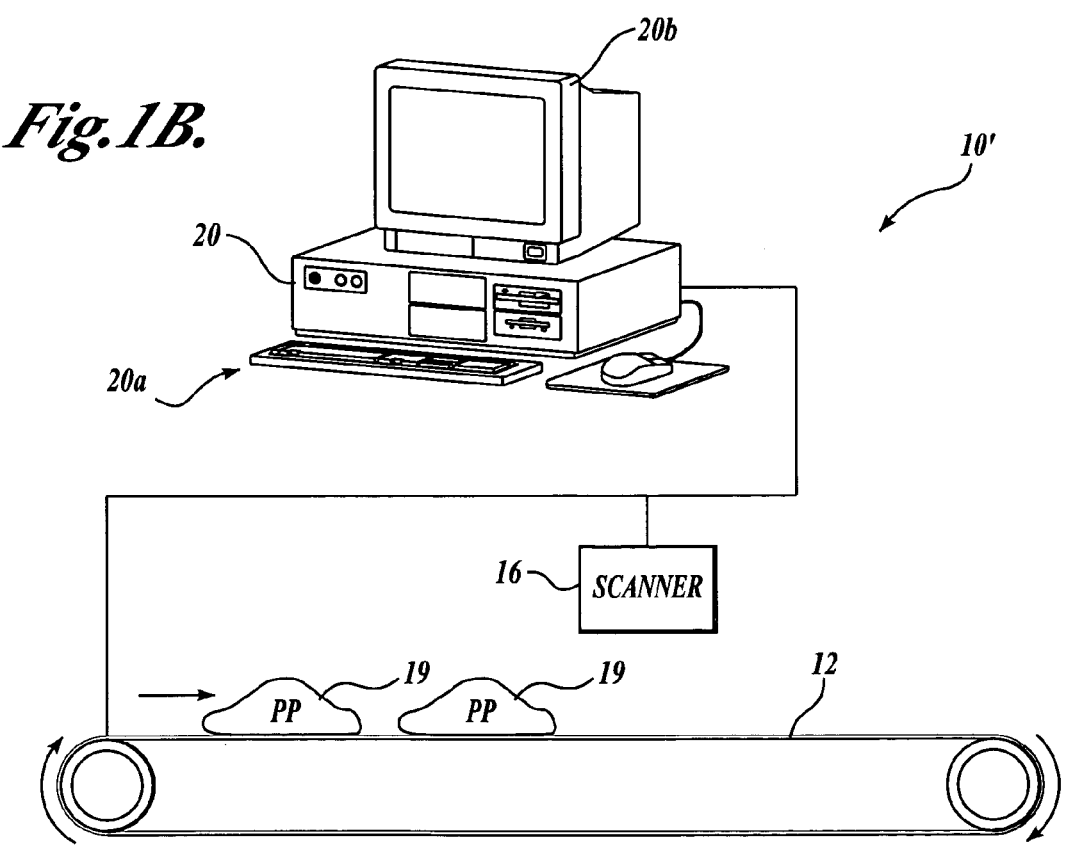
FIG. 1B illustrates another system suitable for use in performing a method of the present invention, wherein the system is operated to verify whether an object (e.g., a portion that has been cut from a workpiece) has a shape that is in conformance to acceptable shape requirements.

FIG. 1B illustrates another system 10' suitable for implementing various exemplary embodiments of a method of the present invention. The system 10' includes a conveyor 12 for carrying an object 19, such as a piece that has been portioned from a workpiece (PP), and a scanner 16 for scanning the object 19. The conveyor 12 and the scanner 16 are coupled to, and controlled by, a processor 20. Generally, the scanner 16 scans in the object 19 to produce scanned information representative of the object 19, and forwards the scanned information to the processor 20. The processor 20 then analyzes the scanned information to determine whether the scanned shape of the object 19 is in conformance with predefined acceptable shape requirements, as will be fully described below in reference to FIG. 4. The system 10' as illustrated in FIG. 1B may be used to receive a reference shape and also a number of acceptable shapes to thereby define acceptable shape requirements, similarly to the system 10 of FIG. 1A during Reference/Acceptable Shape Definition Mode.

Figure 2A:
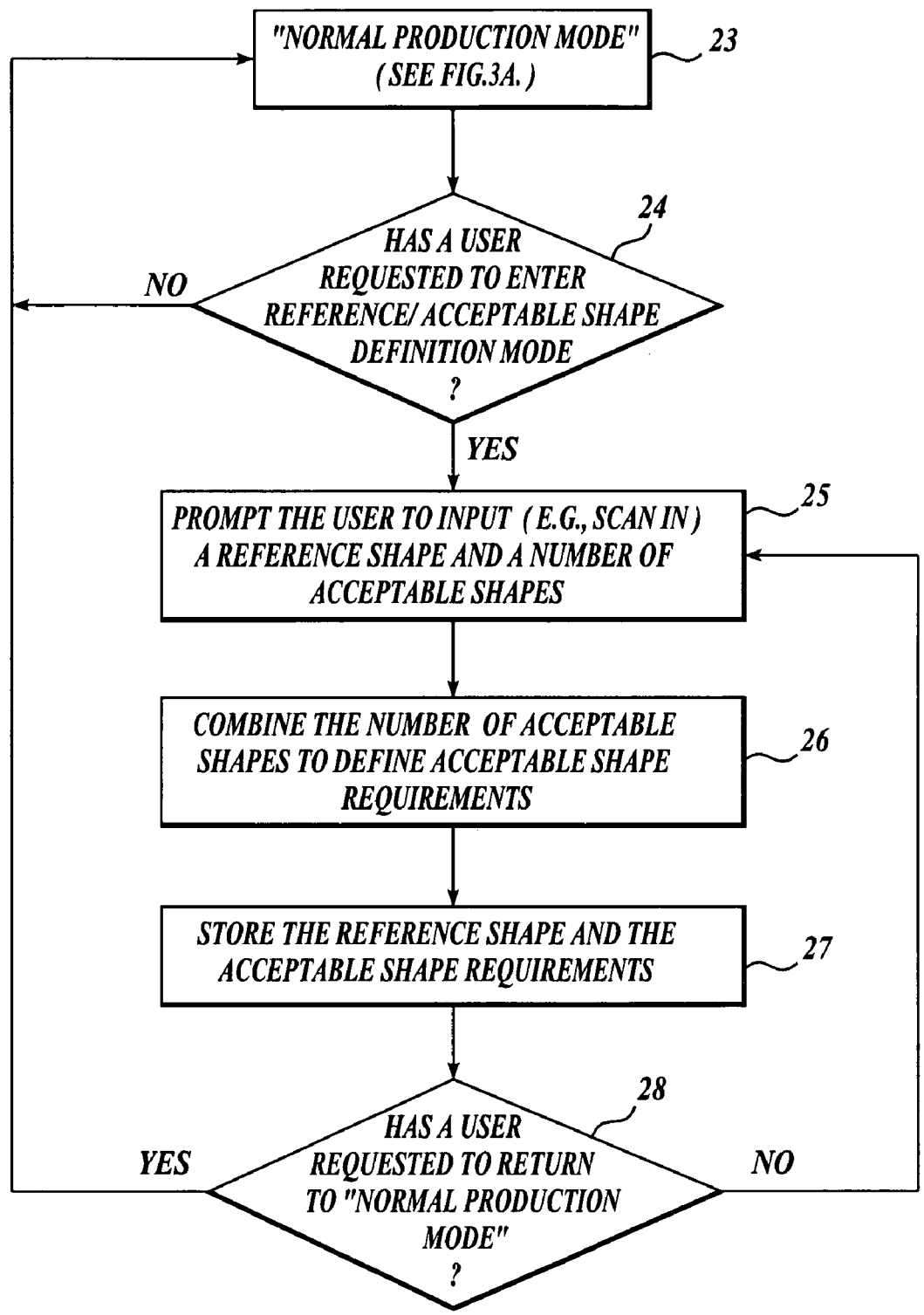
FIG. 2A is a flow chart illustrating the overall process for portioning workpieces into pieces in conformance with shape requirements, including the routine performed during Reference/Acceptable Shape Definition Mode for determining acceptable shape requirements.

FIG. 2A is a flow chart illustrating the overall process for portioning workpieces into acceptable shapes, using the system 10 of FIG. 1A according to one embodiment of the present invention. In step 23, the portioning system 10 is operating in Normal Production Mode. Some examples of routines to be performed in Normal Production Mode will be described in reference to FIGS. 3A and 4 below. In step 24, it is determined whether a user has requested to enter Reference/Acceptable Shape Definition Mode. For example, referring additionally to FIG. 1A, the user may request to enter Reference/Acceptable Shape Definition Mode by using any suitable input device 20a, to select a "Reference/Acceptable Shape Definition Mode" icon displayed on the monitor 20b. If such a request is received, then proceeding to step 25, the system 10 prompts the user to input a reference shape, into which workpieces should be portioned, and also a number of acceptable shapes, which may deviate from the reference shape and yet into which workpieces may be portioned.

The user may input a reference shape in various ways, as disclosed in detail in co-assigned co-pending U.S. patent application Ser. No. 11/030,622, filed Jan. 5, 2005, which is explicitly incorporated by reference herein. For example, the system 10 may prestore several standard shapes, from which the user can select one as an initial template and edit the template using the input device 20a and the output device 20b to define a reference shape. As another example, the user may simply scan a reference shape into the system 10 using the system's scanner 16. The reference shape may be an actual product cut into a desired shape with scissors by the user, or may be a template shape cut out from cardboard, or made of clay, Play-Doh®, etc. The reference shape is stored in the system 10.

Similarly, the user may input a statistically significant number of acceptable shapes that are considered to cover the acceptable range of shapes by scanning those shapes into the system 10. These acceptable shapes may be the actual portioned pieces that the user considers as having acceptable shapes, or the acceptable shapes that the user has cut out from cardboard, made of clay, Play-Doh®, etc.

In step 26, the system 10 combines the received acceptable shapes, including the reference shape itself, to define (or quantify) the acceptable shape requirements. The acceptable shape requirements will then be used by the system 10 as geometric guidelines and boundaries for ascertaining whether a shape, which may deviate from a reference shape, is still acceptable.

Prior to combining the acceptable shapes, they should be aligned with each other, i.e., properly oriented and zoomed so that all are substantially coincident with each other.

Figure 5C:
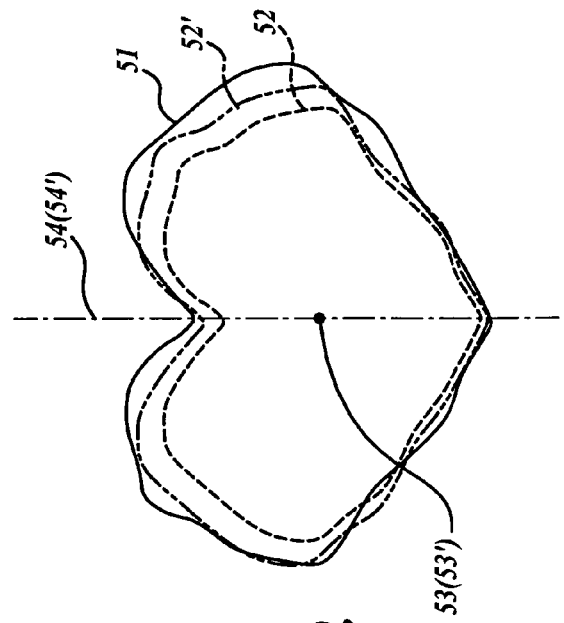
FIGS. 5A-5D illustrate a method of aligning multiple shapes by properly orienting them and zooming them so that they are substantially coincident with each other.
Figure 5D:
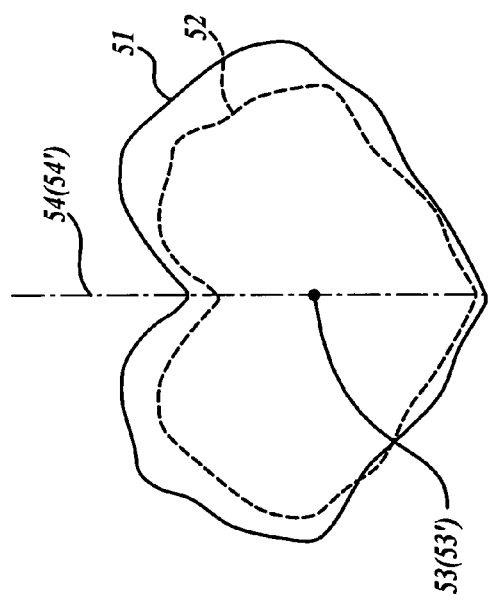
Figure 5A:
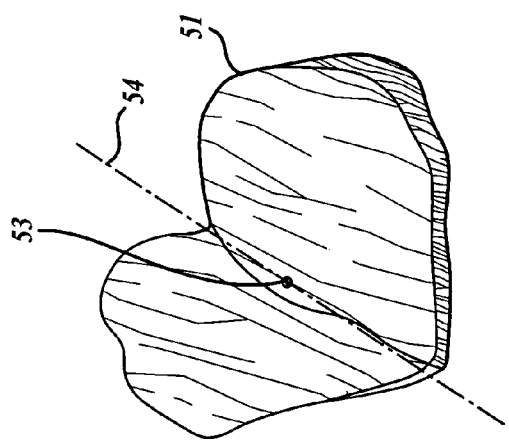
Figure 5B:
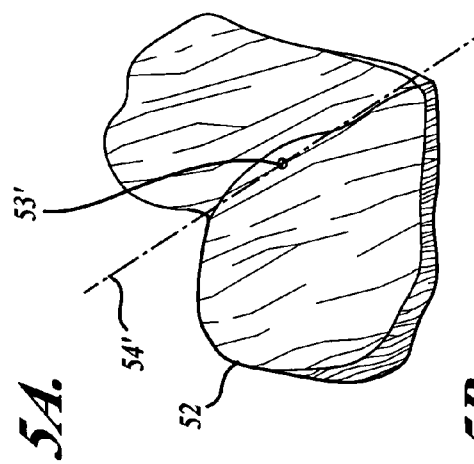

FIGS. 5A-5D illustrate a method of aligning two shapes by properly orienting and zooming them, in accordance with one embodiment of the present invention. FIGS. 5A and 5B illustrate two heart shapes 51 and 52, respectively. To orient these two shapes properly, the centroid 53, 53' and the principle axis 54, 54' are calculated for each of the shapes 51 and 52. As well known in the art, the centroid represents the center of mass of an object of uniform density, and the principle axis represents the axis with a minimum (or maximum) moment of inertia. Thus, the centroid and principle axis may be calculated by considering each shape as a mass of uniform density defined by a 2D perimeter. In FIG. 5C, the two shapes 51 and 52 are superimposed by matching their respective centroids 53, 53' and principle axes 54, 54'. Note that there is a substantial difference in size between the two shapes 51 and 52. Thus, in FIG. 5D, the smaller shape 52 of FIG. 5B is scaled up (or zoomed up) to a shape 52' so that its size substantially corresponds with the size of the larger shape 51 of FIG. 5A. The scaling up or down may be controlled by various means, for example, by zooming up a smaller shape until its area reaches or approximates the area of the larger shape. After the zooming step is complete, the two shapes 51 and 52' are not only properly oriented but also properly zoomed with respect to each other so that the two shapes are substantially coincident with each other. As should be apparent to one skilled in the art, all acceptable shapes that are not the reference shape should be zoomed to be substantially coincident with the reference shape. In other words, the reference shape should be used as the standard to which all other acceptable shapes should be scaled up or down to substantially coincide.

Other methods of properly orienting two or more shapes for the purpose of their comparison are also possible, as will be apparent to one skilled in the art. One such method is a Minimum-Width-Rectangle method. According to this method, on any polygon type shape made up of perimeter points (e.g., 100-200 points for each shape), working lines are found that lie tangent to the perimeter points, respectively. Then, the minimum width of two parallel working lines is found. This will be the most narrow width of the shape. Next, a rectangle is drawn that touches all four sides of the shape, using the two parallel working lines (having the minimum width) and two other working lines that lie perpendicularly to the two minimum-width parallel working lines. This is called the minimum-width rectangle of the shape. Then, multiple shapes may be properly oriented (or superimposed) by matching their respective minimum-width rectangles.

Once all the acceptable shapes, including the reference shape, have been aligned, then the aligned acceptable shapes may be combined to determine the acceptable shape requirements, which define and encompass each of the acceptable shapes entered by the user. Various methods of determining the acceptable shape requirements are possible. For example, the inner-most and outer-most boundaries that cover the entire set of acceptable shapes may be calculated and stored as the acceptable shape requirements. Thereafter, during Normal Operation Mode or during a routine to verify whether an object shape (e.g., a portion shape) is acceptable (FIG. 3B), a portion shape is deemed to be acceptable if the perimeter of the portion shape, after it has been properly oriented and zoomed to be coincident with the reference shape, falls within the inner- and outer-most boundaries.

Figure 6:
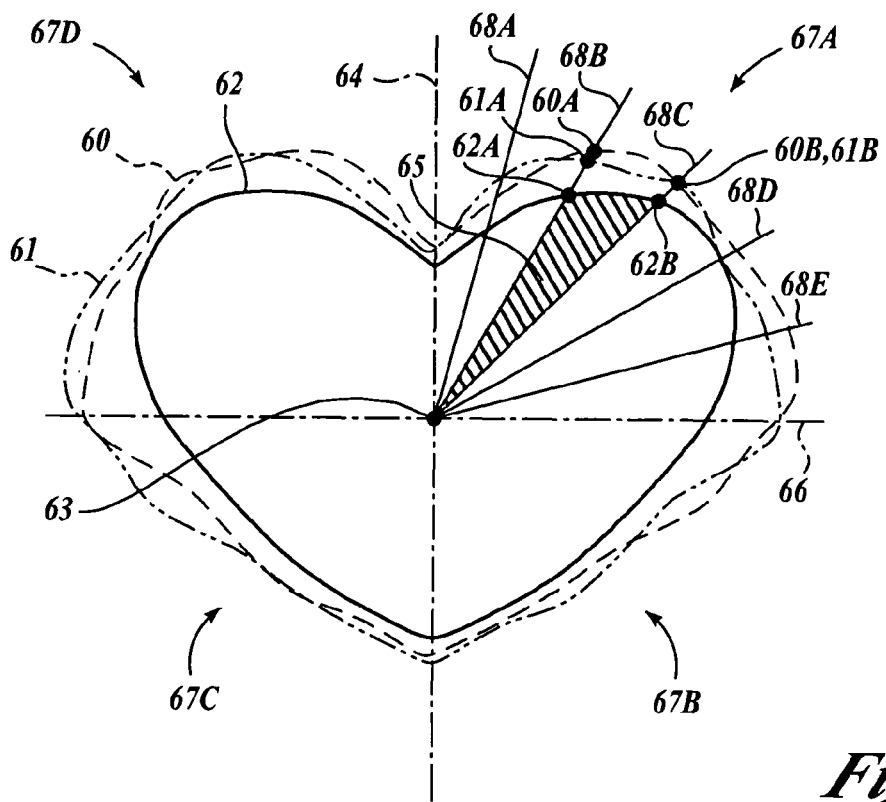
FIG. 6 illustrates a method of combining multiple acceptable shapes to thereby obtain the acceptable shape requirements that define the geometric guidelines and boundaries for all of the acceptable shapes.

In general, any method of determining statistical properties of a number of acceptable shapes may be used to combine these acceptable shapes according to the present invention. FIG. 6 illustrates another example of combining a number of acceptable shapes including a reference shape, which have been properly oriented and zoomed with respect to the reference shape, to obtain the acceptable shape requirements in accordance with one embodiment of the present invention. FIG. 6 shows three heart shapes 60, 61, and 62, of which shape 62 is a reference shape. The shapes 60 and 61 have been properly aligned (i.e., oriented and zoomed) relative to the reference shape 62 based on their common centroid 63 and principle axis 64. At this point, these shapes 60, 61, and 62 may be divided into a number of equal-angle slices 65 by equiangularly arranged spokes 68 that radially extend from the centroid 63. (Only the five spokes 68A-68E are shown in FIG. 6.) One such slice 65 taken from the reference shape 62 is illustrated as a cross-hatched section in FIG. 6. In the illustrated example, the shapes 60, 61, and 62 are divided into four quadrant portions 67A-67D, using the principle axis 64 and an axis 66 perpendicular to the principle axis 64 as the boundaries, and each of the quadrant portions is divided into equiangular slices 65 (e.g., six such slices 65 per quadrant portion, in the illustrated example).

Then, with respect to each of the slices that share the same spokes 68 (i.e., bound between the same pair of spokes), the mean and the standard deviation of the intersection between the shape perimeter and each spoke are calculated. In FIG. 6, a slice of the shape 60, a slice of the shape 61, and a slice of the shape 62, which all are bound by the same pair of spokes 68B and 68C, intersect with the spoke 68B at points 60A, 61A, and 62A, respectively. Similarly, they intersect with the spoke 68C at points 60B, 61B, and 62B, respectively. Then, the mean and standard deviation of points 60A, 61A, and 62A along the spoke 68B are calculated. Likewise, the mean and standard deviation of points 60B, 61B, and 62B along the spoke 68C are calculated. In this manner, a set of the mean and standard deviation values are calculated along the periphery of the shapes 60, 61, and 62, and these values may then be used as the acceptable shape requirements that define the geometric guidelines and boundaries of all acceptable shapes. Specifically, a mean perimeter may be created by connecting the mean position along each of the spokes 68. A confidence limit may be defined in terms of the standard deviation at each of the spokes 68 and used to determine whether a newly received and properly aligned shape is an acceptable shape. The user may modify the allowable shape variation by changing the confidence limit or the number of allowable standard deviations at each spoke.

Figure 7:
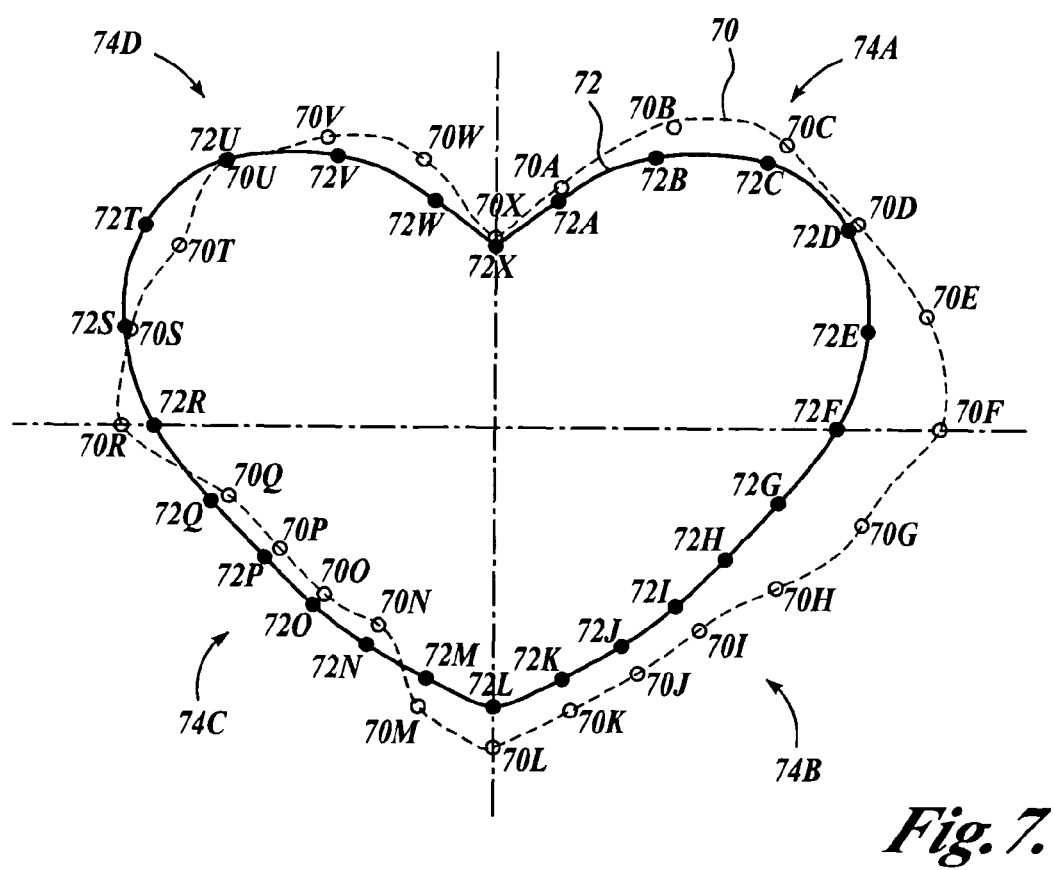
FIG. 7 illustrates a method of calculating a positional difference between two shapes.

A further example of combining a number of acceptable shapes (which have been properly oriented and zoomed) includes calculating a Root-Mean-Square (RMS) error between each of the acceptable shapes and the reference shape. Specifically, referring to FIG. 7, the deviation (or difference) between a reference shape 72 and an acceptable shape 70 may be calculated in terms of a RMS error for each coinciding pair of perimeter points (e.g., equidistant points 1-N taken along the perimeter of each shape). In FIG. 7, the perimeter of the reference shape 72 is equidistantly divided by perimeter points 72A-72X. Similarly, the perimeter of the acceptable shape 70 is equidistantly divided by corresponding perimeter points 70A-70X. In the illustrated embodiment, the reference shape 72 and the acceptable shape 70 are first divided into four quadrant portions 74A-74D between principle axes, and then the perimeter of the shapes 70 and 72 in each of the quadrant portions is divided into a number of equal-length segments (six segments, in the illustrated embodiment). Then, for each pair of corresponding points, such as pair A (points 70A and 72B); pair B (points 70B and 72B); pair C (points 80C and 82C); and so on, the difference in position is calculated. The difference may be readily calculated, for example, by using the x-y coordinates of the position of each of these perimeter points, as the square root of the sum of squares of x and y errors. Thereafter, the square values of these distance values are summed up, and the sum is divided by the number of corresponding pairs (i.e., total twenty-four pairs of A-X, in the illustrated embodiment), and finally a square root of the quotient is taken as the RMS error value between the reference shape 72 and the acceptable shape 70.

An RMS error value may be calculated between the reference shape and each of a number of acceptable shapes to obtain the maximum RMS error value, which can then be used to define the acceptable shape requirements. For example, during Normal Production Mode or during a routine to verify whether an object shape (e.g., a portion shape) is acceptable (FIG. 3B), a portion shape is deemed to be acceptable if an RMS error value between the portion shape and the reference shape is within the maximum RMS error value.

In accordance with a further embodiment of the present invention, the acceptable shape requirements may be further refined to specify certain "acceptable" defects or attributes. For example, typically, an image of a workpiece is scanned in by the scanner 16 and the scanned image is processed by the processor 20 to look for various predefined defects and attributes that are generally considered undesirable by the user. The predefined defects and attributes include, for example, a concave region of a minimum size (in the plan view parallel to the conveyor surface) with a small radius indicating a tear; an aspect ratio between the length and width indicating a shape that is out of proportion; interior holes in the scanned-in workpiece; the presence of fat, bone, or cartilage; rib meat present on the wings of a butterfly-shaped chicken piece; too much (or little) depth of the wing notch in a butterfly-shaped meat, etc. If any of these defects and attributes is found in one or more of the acceptable shapes that have been input and used to define the acceptable shape requirements, then such defects and attributes are deemed as "acceptable" and will not be used to reject shapes during Normal Production Mode or during a routine to verify whether an object shape (e.g., a portion shape) is acceptable (FIG. 3B). In other words, any defects or attributes, which may otherwise be used by the system 10 to reject any shapes as unacceptable, will not be so used if they are found in the one or more acceptable shapes that are input and combined to define the acceptable shape requirements. Thus, the acceptable shape requirements may define these defects and attributes as "acceptable" defects and attributes.

It should be understood that the above described methods for combining a number of acceptable shapes to obtain acceptable shape requirements are merely exemplary, and various other methods for achieving the same are possible, as would be apparent to one skilled in the art.

Figure 8A:
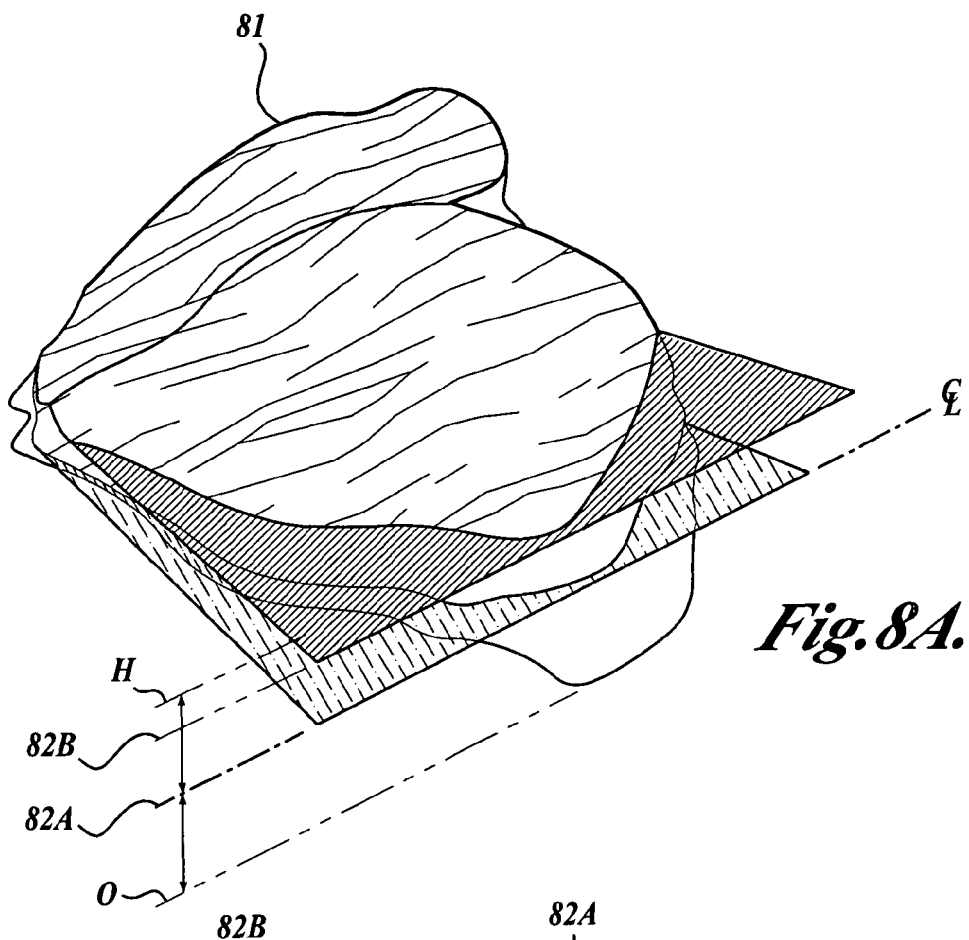
FIGS. 8A and 8B illustrate the concept of "virtually" slicing an object (e.g., piece) at a certain height level so as to determine whether the perimeter shape of the virtual slice, as opposed to the entire object (piece), is in conformance with the predefined acceptable shape requirements.
Figure 8B:
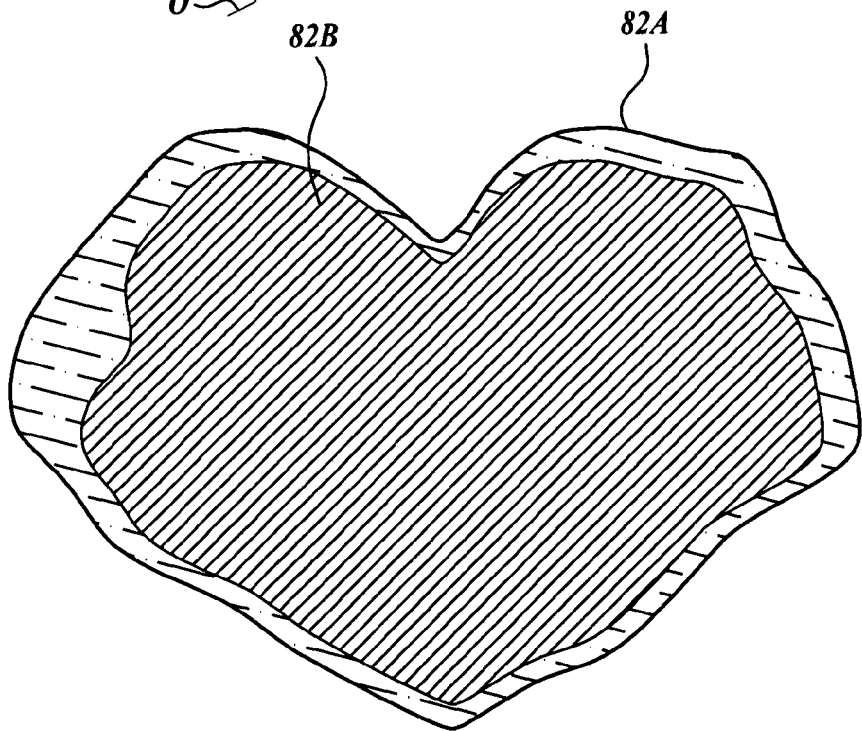

In accordance with a still further embodiment of the present invention, step 26 [FIG. 2A] of combining a number of acceptable shapes to obtain the acceptable shape requirements may be performed, not by evaluating the perimeter of an entire piece having an acceptable shape, but by evaluating the perimeter of a virtual slice through the piece at a specific height. Specifically, referring to FIG. 8A, a piece 81 having an acceptable shape has a height "H," and the perimeter shape of a virtual slice at different heights varies along the height. For example, as illustrated, the perimeter shape of a virtual slice taken at height 82A (a midpoint of height "H") is different from the perimeter shape of a virtual slice taken at height 82B, as more clearly shown in FIG. 8B. The perimeter shape of a virtual slice may be determined based on a thickness profile and/or an area/volume distribution of the scanned piece, as developed by the processor 20. In some embodiments, the user may wish to define acceptable shape requirements in terms of the acceptable shapes of a specific virtual slice (e.g., the slice taken at height 82A of FIG. 8A), or the volume above the virtual slice, or the volume below the virtual slice. For example, the volume above a specific virtual slice may be calculated based on one or more perimeter shapes of virtual slices taken above the specific virtual slice, using a suitable interpolation method. Thus, the acceptable shape requirements may be defined not only in terms of the perimeter of an entire scanned-in piece, but also (or alternatively) in terms of the perimeter shape(s) of one or more virtual slice(s) taken at certain height(s).

Once the acceptable shapes are combined to thereby define the acceptable shape requirements to be used in portioning workpieces into "acceptable shapes" (i.e., within acceptable tolerances relative to a reference shape), then in step 27 of FIG. 2A, the acceptable shape requirements are stored, together with the reference shape.

In step 28, it is determined if the user has requested to return to Normal Production Mode. If so, the process returns to step 23 and the system starts to operate in Normal Production Mode. Otherwise, the system remains in Reference/Acceptable Shape Definition Mode, and the process returns to step 25 so that the user can continue to input and/or further refine the reference shape and/or acceptable shape requirements. In various exemplary embodiments, step 28 of returning to Normal Production Mode may be automatic. For example, once the reference shape and acceptable shape requirements are saved in step 27, the system instantly returns to Normal Operation Mode to use the saved reference shape and acceptable shape requirements in all subsequent cutting operations.

As will be apparent from the foregoing description, by receiving and combining a statistically significant number of acceptable shapes, the system 10 essentially "learns" what shape is acceptable and what shape is not. The "learned" standard of acceptable shapes, as defined in terms of the acceptable shape requirements, may then be used to evaluate whether any newly-scanned shape is acceptable or not. It should be understood that a method of learning what shape is acceptable to thereby define acceptable shape requirements, described above in reference to FIG. 2A, steps 25-27, may be readily performed in the system 10' of FIG. 1B, which is configured to scan and verify an object shape (e.g., a portion shape) and which does not necessarily require a portioner to portion a workpiece into an object (e.g., a portion).

Figure 2B:
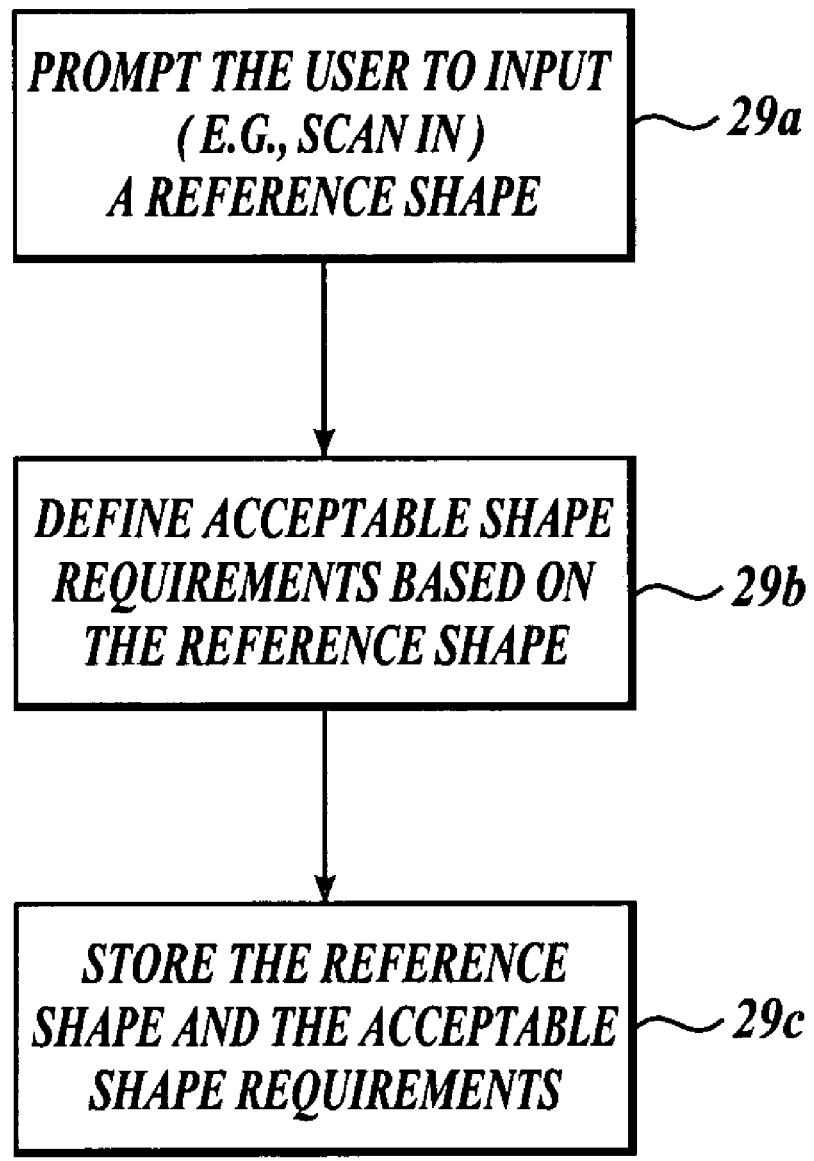
FIG. 2B is a flow chart illustrating a method of receiving a reference shape and defining acceptable shape requirements based on the received reference shape, in accordance with the present invention.

FIG. 2B illustrates a further embodiment of a method of the present invention for defining acceptable shape requirements. In step 29a, the system 10 of FIG. 1A (or the system 10' of FIG. 1B) prompts the user to input a reference shape, into which workpieces should be portioned. As before, the user may input a reference shape in various ways, such as by simply scanning a reference shape into the system 10 (or 10') using the system's scanner 16. In step 29b, the processor 20 defines acceptable shape requirements based on the received (e.g., scanned-in) reference shape.

For example, a maximum RMS error value allowable between the reference shape and an acceptable shape may be selected and used to define the acceptable shape requirements. Unlike the previous method discussed above in reference to FIG. 2A, in which the maximum RMS error value was calculated based on actual comparison between a reference shape and a number of acceptable shapes, in the present embodiment, the maximum RMS error value may be simply selected or predefined by the user. As another example, the acceptable shape requirements may be defined in terms of the percentage of area not conforming to the reference shape. In these examples, the user may set a suitable value (e.g., the maximum RMS error value, the percentage of area value, etc.) so as to adjustably define the allowable shape variation from the reference shape. As still another example, the acceptable shape requirements may be defined based on a reference shape, by taking the perimeter of the reference shape as providing the mean positional values and by further selecting a standard deviation value that defines acceptable deviation from the mean positional values. In this example, a confidence limit may be defined in terms of the standard deviation at each of various perimeter points along the reference shape. The user may modify the allowable shape variation by changing the confidence limit or the number of allowable standard deviations.

Other methods of defining acceptable shape requirements based on a reference shape, without necessarily requiring actual evaluation of two or more acceptable shapes, are also possible, as will be apparent to one skilled in the art.

Finally, in step 29c, the acceptable shape requirements are stored, together with the reference shape.

In accordance with some embodiments of the present invention, acceptable shape requirements defined in various methods of the present invention may then be stored in a computer-readable medium (e.g., a memory device), which can be transferred from one computing device to another so that multiple computing devices can share the same acceptable shape requirements. Similarly, the computer-executable instructions defining the acceptable shape requirements may be encoded in a signal, which may be used to transfer the acceptable shape requirements from one computing device (e.g., a network) to another (e.g., a workstation, a scanning station, a portioning system, etc.).

Figure 3A:
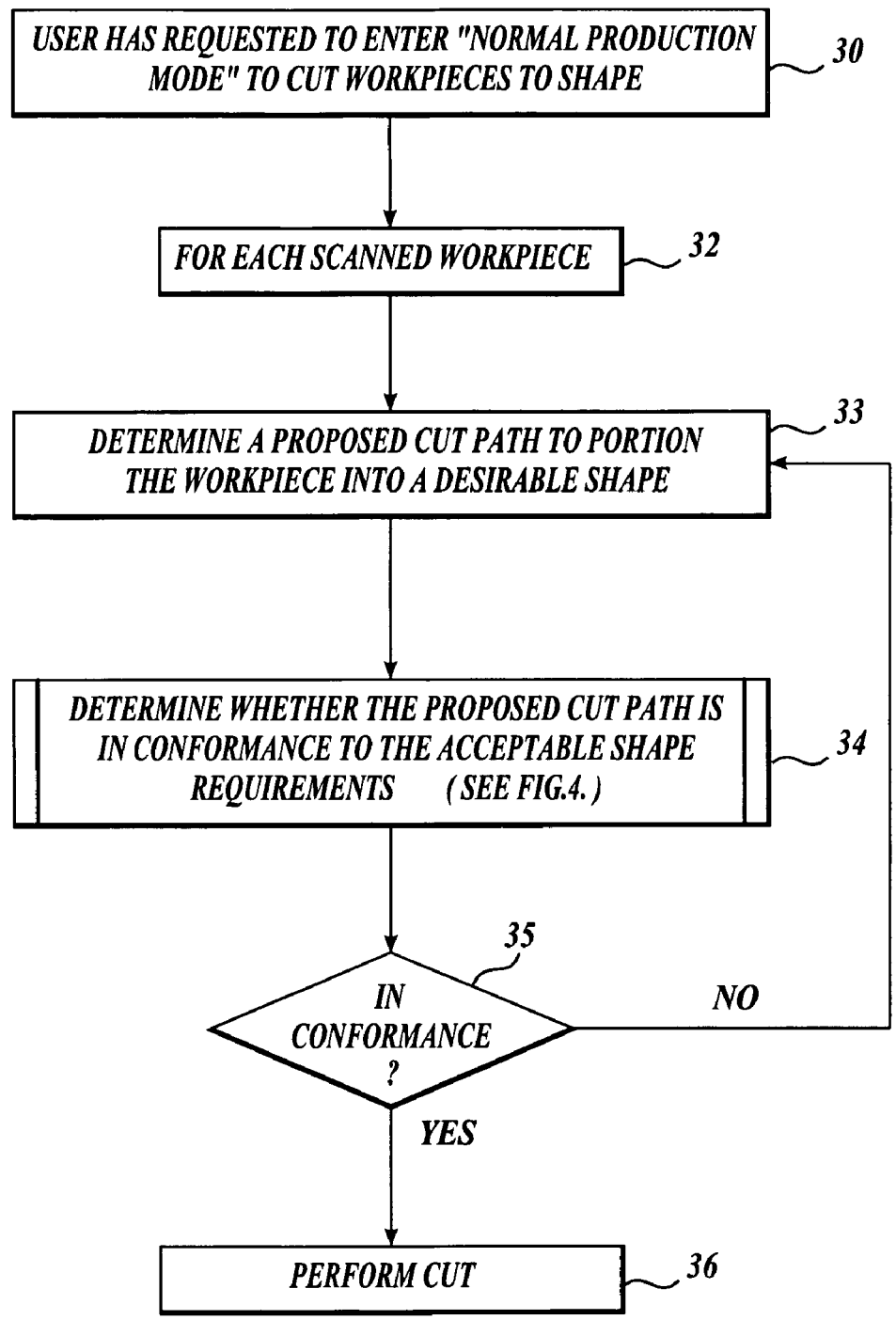
FIG. 3A is a flow chart illustrating the routine performed during Normal Production Mode for determining an acceptable shape to be cut prior to actual cutting.
Figure 3B:
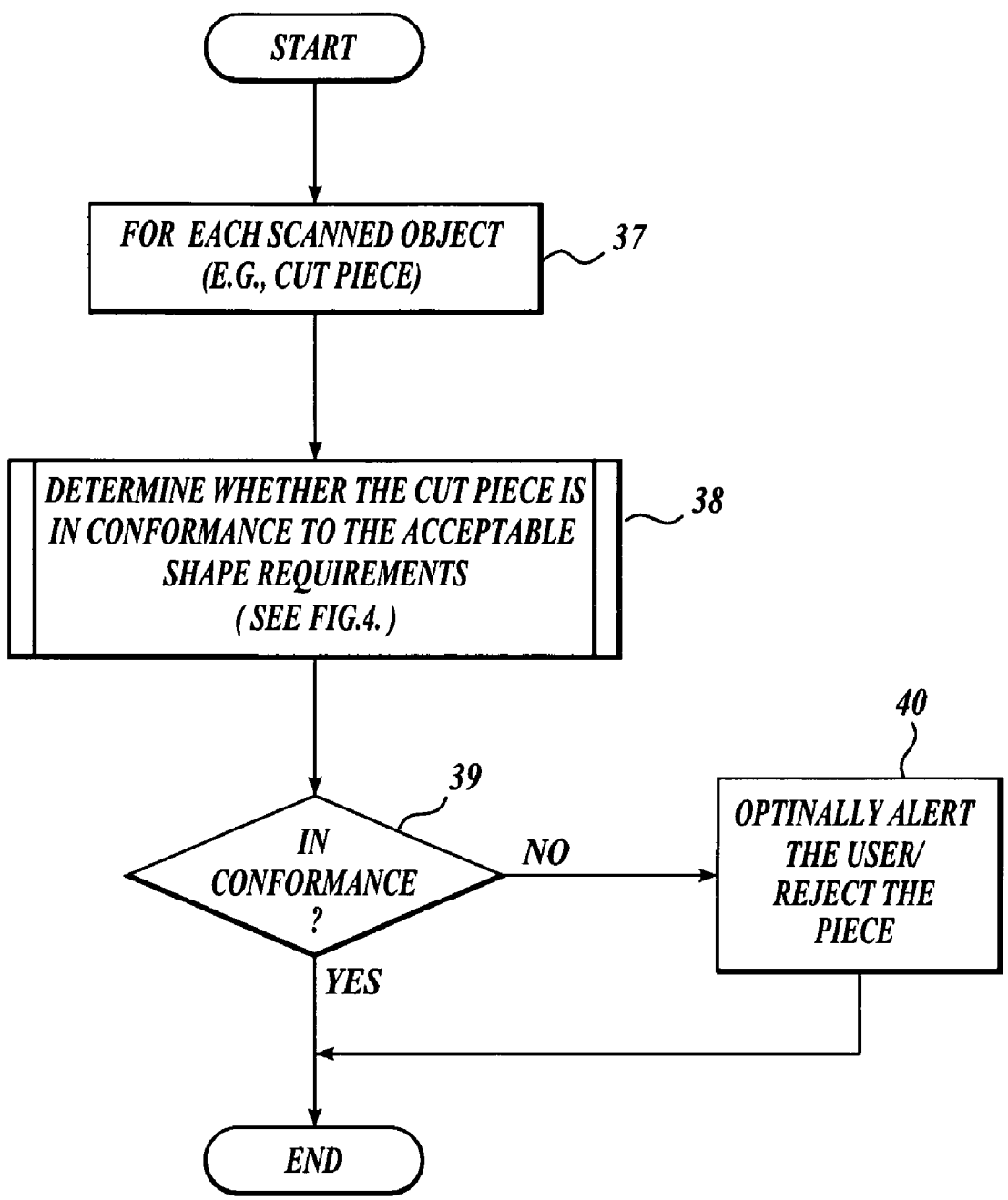
FIG. 3B is a flow chart illustrating a routine performed for determining whether a scanned shape of an object (e.g., a piece that has been cut from a workpiece) is in conformance with acceptable shape requirements.

FIG. 3A is a flow chart illustrating a routine performed during Normal Production Mode of the system 10 of FIG. 1A, in which workpieces are to be portioned into acceptable shapes. In step 30, the user requests to enter Normal Production Mode to cut workpieces into acceptable shapes according to the reference shape and the acceptable shape requirements defined during Reference/Acceptable Shape Definition Mode. Typically, the system 10 operates in Normal Production Mode by default, but entry into Normal Production Mode may be specified by the user, for example, after the user completes the operation in Reference/Acceptable Shape Definition Mode. Then, in Normal Production Mode, for each scanned workpiece (step 32), in step 33, the processor 20 determines a proposed cut path to portion the workpiece into a desirable shape. In step 34, the system automatically determines whether the proposed cut path is in conformance to the acceptable shape requirements that have been defined in Reference/Acceptable Shape Definition Mode. The routine for determining whether a proposed cut path is in conformance to the acceptable shape requirements will be described in detail in reference to FIG. 4.

In step 35, if it is determined that the proposed cut path is not in conformance with the defined acceptable shape requirements, then the system 10 may return to step 33 to determine a revised cut path to portion the workpiece into a desirable shape. If, in step 35, it is determined that the proposed cut path is in conformance with the acceptable shape requirements, then the system 10 proceeds to step 36 and uses the cutter 18 to perform cutting of the workpiece according to the proposed cut path.

FIG. 3B is a flow chart illustrating a routine performed for determining whether a scanned shape of an object (e.g., a cut piece) is in conformance with acceptable shape requirements. The routine may be performed, for example, by the system 10' of FIG, 1B. For each scanned object (step 37), in step 38, the processor 20 determines whether a scanned shape of the object is in conformance to the acceptable shape requirements, which have been pre-defined as described above. The routine for determining whether the scanned object shape is in conformance to the acceptable shape requirements will be described in detail in reference to FIG. 4.

In step 39, if it is determined that the scanned object shape is not in conformance with the defined acceptable shape requirements, then the system 10' may proceed to optional step 40 to issue a suitable visual and/or audio notification to the user. Alternatively or additionally, the scanned object determined to be not in conformance with the acceptable shape requirements may be automatically rejected or removed from the conveyor 12 using suitable pickup/diverter means.

Figure 4:
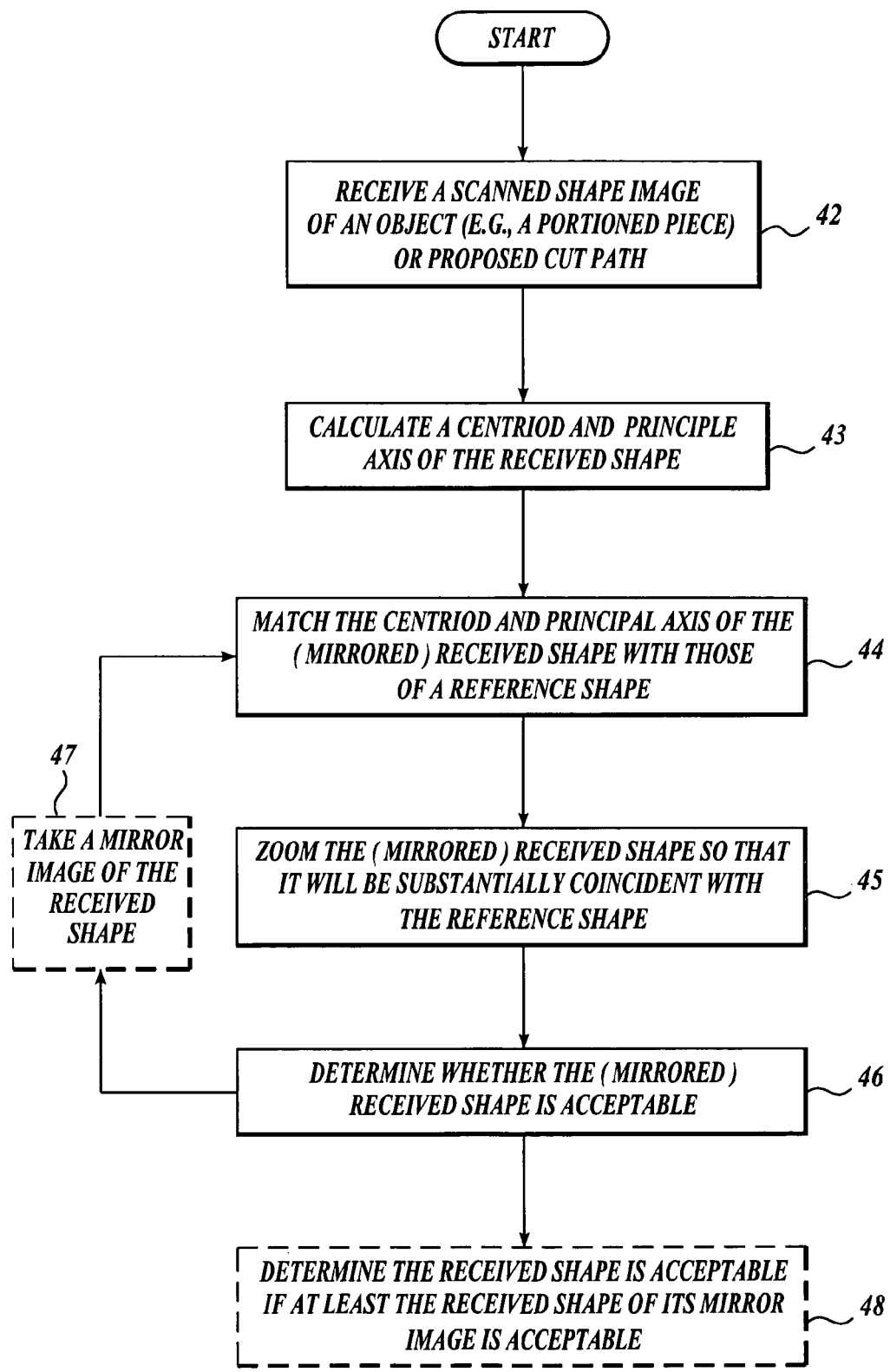
FIG. 4 is a flow chart illustrating one method of aligning a received (e.g., scanned) shape with a reference shape so as to determine whether the received shape is an acceptable shape in conformance to acceptable shape requirements, in accordance with one embodiment of the present invention.

FIG. 4 illustrates a routine to be performed by the system 10 of FIG. 1A or the system 10' of FIG. 1B to determine whether a proposed cut path and/or object (e.g., actual cut piece) are in conformance to the predefined acceptable shape requirements, in accordance with one embodiment of the present invention. In step 42, the system receives a proposed cut path or the shape of an object (e.g., cut piece) as scanned in. In step 43, with respect to the received shape (of a proposed cut path or an object), a centroid and a principle axis are found. Next, in step 44, the centroid and principle axis of the received shape are matched with those of a reference shape, which has been stored in the system. Thereafter, in step 45, the received shape is zoomed (up or down) so that it will be substantially coincident with the reference shape. The aligning method consisting of matching two shapes based on their respective centroids and principle axes and zooming one shape relative to the other was described above in reference to FIGS. 5A-5D.

In step 46, with respect to the aligned (i.e., properly oriented and zoomed) received shape, it is determined whether it is in conformance with the predefined shape requirements. As will be apparent to those skilled in the art, the precise operation to be performed in this step will depend on how the acceptable shape requirements have been defined during Reference/Acceptable Shape Definition Mode or during a routine to define acceptable shape requirements, as shown in FIGS. 2A and 2B (as executed by the system 10' of FIG. 1B, for example). For example, if the acceptable shape requirements are defined in terms of the outer-most and inner-most perimeters of all acceptable shapes that have been used to define the acceptable shape requirements, then the received shape is determined to be acceptable if it falls within the outer-most and inner-most perimeters. As another example, if the acceptable shape requirements are defined in terms of the mean and standard deviation values of various perimeter points of acceptable shapes, then the corresponding perimeter points of the received shape are calculated and compared with the mean and the standard deviation values. As a further example, if the acceptable shape requirements are defined in terms of a maximum allowable Root-Mean-Square (RMS) error value relative to the position of a reference shape, then a RMS error value is calculated between the received shape and the reference shape. If the calculated RMS error value does not exceed the maximum allowable RMS error, then it is determined that the received shape is in conformance to the acceptable shape requirements.

In a further embodiment of the present invention, after it is determined whether the received shape is in conformance to the acceptable shape requirements in step 46, the system may proceed to step 47, in which a mirror image of the received shape (of a proposed cut path or object) is taken. Thereafter, returning to step 44, the mirror image of the received shape and the reference shape are superimposed by matching their respective centroids and principle axes. At step 45, the mirror image of the received shape is zoomed so that it will be substantially coincident with the reference shape. Then, in step 46, it is determined whether the mirror image of the received shape is in conformance with the acceptable shape requirements. Finally, in step 48, it is determined that the received shape is acceptable if at least one of the received image and its mirror image is in conformance with the acceptable shape requirements.

In various exemplary embodiments of the present invention, a reference shape and acceptable shapes are used to automatically define the acceptable shape requirements, which specify what deviation from the reference shape is acceptable. Thus, as more acceptable shapes are entered into the system, the acceptable shape requirements may be further refined, and the refined acceptable shape requirements may be used in all subsequent product (workpiece) processing operations, such as portioning and shape-verification operations. As such, the system is capable of continuously "learning" what shape is acceptable and what shape is not. In various other exemplary embodiments of the present invention, a reference shape alone may be used to define the acceptable shape requirements.

Accordingly, the present invention offers various systems and methods for automatically portioning and otherwise processing workpieces into pieces in conformance with acceptable shape requirements, which define acceptable shape deviations from a reference shape. In some embodiments, the systems and methods automatically define acceptable shape requirements based on a statistically significant number of acceptable shapes entered by the user. Thus, the user can use the systems and methods of the present invention to objectively and accurately quantify what these acceptable shapes are in terms of the acceptable shape requirements. In other embodiments, the systems and methods define acceptable shape requirements based on a reference shape entered by the user. In all embodiments, the defined acceptable shape requirements can thereafter be used to automatically portion workpieces into portions having acceptable shapes and/or verify whether portioned pieces have acceptable shapes.

The invention claimed is:

1. A system for automatically checking whether an object is in conformance to acceptable shape requirements, wherein a reference shape is a shape that the object should be in and the acceptable shape requirements define an acceptable shape of the object that may deviate from the reference shape and yet is acceptable to a user, the system comprising:
   (a) a processor;
   (b) a memory coupled to the processor, the memory storing the reference shape and acceptable shape requirements which define geometric guidelines and boundaries for acceptable shapes; and
   (c) a scanner coupled to the processor for scanning objects and sending scanned information of the objects to the processor;
   wherein the processor is configured to perform the steps of:
      (i) receiving a scanned shape of an object from the scanner;
      (ii) aligning the scanned shape of the object with the reference shape, by superimposing the scanned shape of the object and the reference shape and zooming the scanned shape of the object so that it becomes substantially coincident with the reference shape; and
      (iii) determining whether the scanned shape of the object is in conformance to the acceptable shape requirements.

2. The system of claim 1, further comprising a cutter coupled to the processor for portioning a workpiece according to portioning instructions received from the processor, wherein the processor is configured to perform the further steps of:
   (iv) receiving scanned information of a workpiece to be cut from the scanner;
   (v) determining a shape representing a proposed cut path for cutting the scanned workpiece into an object;
   (vi) aligning the shape representing the proposed cut path with the reference shape; and
   (vii) determining whether the shape representing the proposed cut path is in conformance to the acceptable shape requirements.

3. The system of claim 1, wherein superimposing the scanned shape of the object and the reference shape in step (ii) comprises:
   calculating a centroid and principle axis for each of the scanned shape of the object and the reference shape; and
   superimposing the scanned shape of the object and the reference shape by matching their respective centroids and principle axes.

4. The system of claim 1, wherein the processor is further configured to perform the step of taking a mirror image of the scanned shape of the object, and to further repeat steps (ii) and (iii) with respect to the mirror image so as to align the mirror image with the reference shape and to determine whether the mirror image is in conformance to the acceptable shape requirements.

5. The system of claim 4, wherein the processor is further configured to determine that the scanned shape of the object is acceptable if at least one of the scanned shape of the object and its mirror image is in conformance to the acceptable shape requirements.

6. The system of claim 1, wherein the acceptable shape requirements are defined in terms of the geometric guidelines and boundaries selected from a group consisting of: (1) the inner-most and outer-most boundaries of the acceptable shapes; (2) the mean and standard deviation values of multiple perimeter points of the acceptable shapes; (3) a maximum allowable Root-Mean-Square (RMS) position error value between an acceptable shape and the reference shape; and (4) acceptable defects and attributes found in one or more of the acceptable shapes.

7. The system of claim 1, wherein the acceptable shape requirements are defined in terms of the geometric guidelines as applied to a perimeter shape of a virtual slice taken at a certain height of an object.

8. A system for automatically checking whether a food product is in conformance to acceptable shape requirements, wherein a reference shape is a shape that the food product should be in and the acceptable shape requirements define an acceptable shape of the food product that may deviate from the reference shape and yet is acceptable to a user, the system comprising:
   (a) a processor;
   (b) a memory coupled to the processor, the memory storing the reference shape and acceptable shape requirements for the food product which define geometric guidelines and boundaries for acceptable shapes;
   (c) a conveyor for continuously conveying food products; and
   (d) a scanner coupled to the processor for scanning food products that are conveyed on the conveyor and sending scanned information of the food products to the processor;
   wherein the processor is configured to perform the steps of:
      (i) receiving a scanned shape of a food product that is conveyed on the conveyor from the scanner;
      (ii) aligning the scanned shape of the food product with the reference shape by superimposing the scanned shape of the food product and the reference shape and zooming the scanned shape of the food product so that it becomes substantially coincident with the reference shape; and
      (iii) determining whether the scanned shape of the food product is in conformance to the acceptable shape requirements for the food product.

9. The system of claim 8, further comprising a cutter coupled to the processor for portioning a food workpiece according to portioning instructions received from the processor, wherein the processor is configured to perform the further steps of:
   (iv) receiving scanned information of a food workpiece to be cut from the scanner;
   (v) determining a shape representing a proposed cut path for cutting the scanned food workpiece into a food product;
   (vi) aligning the shape representing the proposed cut path with the reference shape; and
   (vii) determining whether the shape representing the proposed cut path is in conformance to the acceptable shape requirements.

10. The system of claim 8, wherein superimposing the scanned shape of the food product and the reference shape in step (ii) comprises:
    calculating a centroid and principle axis for each of the scanned shape of the food product and the reference shape; and
    superimposing the scanned shape of the food product and the reference shape by matching their respective centroids and principle axes.

11. The system of claim 8, wherein the processor is further configured to perform the step of taking a mirror image of the scanned shape of the food product, and to further repeat steps (ii) and (iii) with respect to the mirror image so as to align the mirror image with the reference shape and to determine whether the mirror image is in conformance to the acceptable shape requirements.

12. The system of claim 11, wherein the processor is further configured to determine that the scanned shape of the food product is acceptable if at least one of the scanned shape of the food product and its mirror image is in conformance to the acceptable shape requirements.

13. The system of claim 8, wherein the acceptable shape requirements are defined in terms of the geometric guidelines and boundaries selected from a group consisting of: (1) the inner-most and outer-most boundaries of the acceptable shapes; (2) the mean and standard deviation values of multiple perimeter points of the acceptable shapes; (3) a maximum allowable Root-Mean-Square (RMS) position error value between an acceptable shape and the reference shape; and (4) acceptable defects and attributes found in one or more of the acceptable shapes.

14. The system of claim 8, wherein the acceptable shape requirements are defined in terms of the geometric guidelines as applied to a perimeter shape of a virtual slice taken at a certain height of a food product.

* * * * *